(12) United States Patent
Veillette

(10) Patent No.: US 8,502,640 B2
(45) Date of Patent: Aug. 6, 2013

(54) SYSTEM AND METHOD FOR TRANSMITTING AND RECEIVING INFORMATION ON A NEIGHBORHOOD AREA NETWORK

(75) Inventor: Michel Veillette, Waterloo (CA)

(73) Assignee: Trilliant Networks, Inc., Redwood City, CA (US)

( * ) Notice: Subject to any disclaimer, the term of this patent is extended or adjusted under 35 U.S.C. 154(b) by 888 days.

(21) Appl. No.: 12/275,282

(22) Filed: Nov. 21, 2008

(65) Prior Publication Data

US 2009/0134969 A1  May 28, 2009

Related U.S. Application Data

(60) Provisional application No. 60/989,957, filed on Nov. 25, 2007, provisional application No. 60/989,967, filed on Nov. 25, 2007, provisional application No. 60/989,958, filed on Nov. 25, 2007, provisional application No. 60/989,964, filed on Nov. 25, 2007, provisional application No. 60/989,950, filed on Nov. 25, 2007, provisional application No. 60/989,953, filed on Nov. 25, 2007, provisional application No. 60/989,975, filed on Nov. 25, 2007, provisional application No. 60/989,971, filed on Nov. 25, 2007, (Continued)

(51) Int. Cl.
*G05B 23/02* (2006.01)

(52) U.S. Cl.
USPC ............................................ 340/3.1; 711/100

(58) Field of Classification Search
USPC ................. 340/3.1, 825.69; 702/61; 700/169, 700/291; 714/755, 784; 711/100
See application file for complete search history.

(56) References Cited

U.S. PATENT DOCUMENTS

| 4,132,981 A | 1/1979 | White ........................... 340/203 |
| 4,190,800 A | 2/1980 | Kelly, Jr. et al. ................. 325/37 |

(Continued)

FOREIGN PATENT DOCUMENTS

| JP | 10-070774 | 3/1998 |
| JP | 10-135965 | 5/1998 |

(Continued)

OTHER PUBLICATIONS

"AMRON Technologies Successfully Deploys Advanced Metering Solution for C&I Customers Using Bluetooth" [online], Sep. 2, 2004 [retrieved on Jan. 2, 2009], 3 pp., Retrieved from the Internet: http://www.techweb.com/showpressrelease?articleId=X234101&CompanyId=3.

(Continued)

*Primary Examiner* — Jennifer Mehmood
*Assistant Examiner* — Rufus Point
(74) *Attorney, Agent, or Firm* — Moser Taboada

(57) ABSTRACT

In accordance with the techniques discussed herein, a device can access data stored by other devices or units on a network. Devices recording data can provide the data to another device for display to a user. A user can then use the information to make decisions about how and when to control energy use. A communications logic unit associated with the radio can format messages including data from a data storage unit. Data can be stored in tables and written to or retrieved by reading or writing part of the table or the entire table.

16 Claims, 9 Drawing Sheets

Related U.S. Application Data provisional application No. 60/989,966, filed on Nov. 25, 2007, provisional application No. 60/989,959, filed on Nov. 25, 2007, provisional application No. 60/989,961, filed on Nov. 25, 2007, provisional application No. 60/989,962, filed on Nov. 25, 2007, provisional application No. 60/989,951, filed on Nov. 25, 2007, provisional application No. 60/989,955, filed on Nov. 25, 2007, provisional application No. 60/989,952, filed on Nov. 25, 2007, provisional application No. 61/989,954, filed on Nov. 25, 2007, provisional application No. 60/992,312, filed on Dec. 4, 2007, provisional application No. 60/992,313, filed on Dec. 4, 2007, provisional application No. 60/992,315, filed on Dec. 4, 2007, provisional application No. 61/025,279, filed on Jan. 31, 2008, provisional application No. 61/025,270, filed on Jan. 31, 2008, provisional application No. 61/025,276, filed on Jan. 31, 2008, provisional application No. 61/025,282, filed on Jan. 31, 2008, provisional application No. 61/025,271, filed on Jan. 31, 2008, provisional application No. 61/025,287, filed on Jan. 31, 2008, provisional application No. 61/025,278, filed on Jan. 31, 2008, provisional application No. 61/025,273, filed on Jan. 31, 2008, provisional application No. 61/025,277, filed on Jan. 31, 2008, provisional application No. 61/050,538, filed on May 5, 2008, provisional application No. 61/094,116, filed on Sep. 4, 2008.

(56) References Cited

U.S. PATENT DOCUMENTS

| | | | |
|---|---|---|---|
| 4,204,195 A | 5/1980 | Bogacki | 340/151 |
| 4,254,472 A | 3/1981 | Juengel et al. | 364/900 |
| 4,322,842 A | 3/1982 | Martinez | 370/11 |
| 4,396,915 A | 8/1983 | Farnsworth et al. | 340/870.03 |
| 4,425,628 A | 1/1984 | Bedard et al. | 364/900 |
| 4,638,314 A | 1/1987 | Keller | 340/870.02 |
| 4,749,992 A | 6/1988 | Fitzemeyer et al. | 340/870.02 |
| 5,138,615 A | 8/1992 | Lamport et al. | 370/94.3 |
| 5,216,623 A | 6/1993 | Barrett et al. | 364/550 |
| 5,311,581 A | 5/1994 | Merriam et al. | 379/106.07 |
| 5,432,507 A | 7/1995 | Mussino et al. | 340/870.03 |
| 5,459,727 A | 10/1995 | Vannucci | 370/332 |
| 5,515,509 A | 5/1996 | Rom | 709/228 |
| 5,546,575 A * | 8/1996 | Potter et al. | 1/1 |
| 5,572,438 A | 11/1996 | Ehlers et al. | 700/295 |
| 5,608,780 A | 3/1997 | Gerszberg et al. | 455/436 |
| 5,684,710 A | 11/1997 | Ehlers et al. | 700/293 |
| 5,696,695 A | 12/1997 | Ehlers et al. | 700/286 |
| 5,717,718 A | 2/1998 | Rowsell et al. | 375/260 |
| 5,719,564 A | 2/1998 | Sears | 340/870.02 |
| 5,727,057 A | 3/1998 | Emery et al. | 379/201.07 |
| 5,767,790 A | 6/1998 | Jovellana | 340/870.02 |
| 5,844,893 A | 12/1998 | Gollnick et al. | 370/329 |
| 5,874,903 A | 2/1999 | Shuey et al. | 340/870.02 |
| 5,880,677 A | 3/1999 | Lestician | 340/825.06 |
| 5,892,758 A | 4/1999 | Argyroudis | 370/335 |
| 5,894,422 A | 4/1999 | Chasek | 364/528.26 |
| 5,896,097 A | 4/1999 | Cardozo | 340/870.03 |
| 5,896,566 A | 4/1999 | Averbuch et al. | 455/419 |
| 5,898,387 A | 4/1999 | Davis et al. | 340/870.02 |
| 5,898,826 A | 4/1999 | Pierce et al. | 714/4 |
| 5,914,673 A | 6/1999 | Jennings et al. | 340/870.03 |
| 5,919,247 A | 7/1999 | Van Hoff et al. | 709/217 |
| 5,933,092 A | 8/1999 | Ouellette et al. | 340/870.02 |
| 5,963,146 A | 10/1999 | Johnson et al. | 340/870.01 |
| 5,963,457 A | 10/1999 | Kanoi et al. | 364/528.26 |
| 5,987,011 A | 11/1999 | Toh | 370/331 |
| 5,991,806 A | 11/1999 | McHann, Jr. | 709/224 |
| 6,014,089 A | 1/2000 | Tracy et al. | 340/870.02 |
| 6,026,133 A | 2/2000 | Sokoler | 375/365 |
| 6,044,062 A | 3/2000 | Brownrigg et al. | 370/238 |
| 6,058,355 A | 5/2000 | Ahmed et al. | 702/62 |
| 6,073,169 A | 6/2000 | Shuey et al. | 709/217 |
| 6,075,777 A | 6/2000 | Agrawal et al. | 370/329 |
| 6,078,785 A | 6/2000 | Bush | 455/7 |
| 6,088,659 A | 7/2000 | Kelley et al. | 702/62 |
| 6,097,703 A | 8/2000 | Larsen et al. | 370/254 |
| 6,108,699 A | 8/2000 | Moiin | 709/221 |
| 6,124,806 A | 9/2000 | Cunningham et al. | 340/870.02 |
| 6,134,587 A | 10/2000 | Okanoue | 709/222 |
| 6,137,423 A | 10/2000 | Glorioso et al. | 340/870.02 |
| 6,150,955 A | 11/2000 | Tracy et al. | 340/870.02 |
| 6,195,018 B1 | 2/2001 | Ragle et al. | 340/870.01 |
| 6,239,722 B1 | 5/2001 | Colton et al. | 340/870.02 |
| 6,240,080 B1 | 5/2001 | Okanoue et al. | 370/338 |
| 6,246,677 B1 | 6/2001 | Nap et al. | 370/346 |
| 6,246,689 B1 | 6/2001 | Shavitt | 370/406 |
| 6,249,516 B1 | 6/2001 | Brownrigg et al. | 370/338 |
| 6,300,881 B1 | 10/2001 | Yee et al. | 340/870.02 |
| 6,304,556 B1 | 10/2001 | Haas | 370/254 |
| 6,338,087 B1 | 1/2002 | Okanoue | 709/222 |
| 6,366,217 B1 | 4/2002 | Cunningham et al. | 340/870.31 |
| 6,400,949 B1 | 6/2002 | Bielefeld et al. | 455/434 |
| 6,407,991 B1 | 6/2002 | Meier | 370/338 |
| 6,415,330 B1 | 7/2002 | Okanoue | 709/245 |
| 6,437,692 B1 | 8/2002 | Petite et al. | 340/540 |
| 6,480,505 B1 | 11/2002 | Johansson et al. | 370/449 |
| 6,535,498 B1 | 3/2003 | Larsson et al. | 370/338 |
| 6,538,577 B1 | 3/2003 | Ehrke et al. | 340/870.02 |
| 6,553,355 B1 | 4/2003 | Arnoux et al. | 706/13 |
| 6,556,830 B1 | 4/2003 | Lenzo | 455/450 |
| 6,577,671 B1 | 6/2003 | Vimpari | 375/146 |
| 6,606,708 B1 | 8/2003 | Devine et al. | 726/8 |
| 6,636,894 B1 | 10/2003 | Short et al. | 709/225 |
| 6,653,945 B2 | 11/2003 | Johnson et al. | 340/870.02 |
| 6,657,552 B2 | 12/2003 | Belski et al. | 340/870.02 |
| 6,665,620 B1 | 12/2003 | Burns et al. | 702/62 |
| 6,681,110 B1 | 1/2004 | Crookham et al. | 455/420 |
| 6,681,154 B2 * | 1/2004 | Nierlich et al. | 700/286 |
| 6,687,901 B1 | 2/2004 | Imamatsu | 717/173 |
| 6,691,173 B2 | 2/2004 | Morris et al. | 709/249 |
| 6,697,331 B1 | 2/2004 | Riihinen et al. | 370/236 |
| 6,710,721 B1 | 3/2004 | Holowick | 340/870.02 |
| 6,711,166 B1 | 3/2004 | Amir et al. | 370/395.1 |
| 6,711,409 B1 | 3/2004 | Zavgren, Jr. et al. | 455/445 |
| 6,711,512 B2 | 3/2004 | Noh | 702/65 |
| 6,714,787 B2 | 3/2004 | Reed et al. | 455/445 |
| 6,718,137 B1 | 4/2004 | Chin | 398/3 |
| 6,725,281 B1 | 4/2004 | Zintel et al. | 719/318 |
| 6,728,514 B2 | 4/2004 | Bandeira et al. | 455/13.1 |
| 6,751,455 B1 | 6/2004 | Acampora | 455/414.1 |
| 6,751,672 B1 | 6/2004 | Khalil et al. | 709/230 |
| 6,775,258 B1 | 8/2004 | van Valkenburg et al. | 370/338 |
| 6,778,099 B1 | 8/2004 | Meyer et al. | 340/870.02 |
| 6,785,592 B1 | 8/2004 | Smith et al. | 700/291 |
| 6,826,620 B1 | 11/2004 | Davis et al. | 709/235 |
| 6,829,216 B1 | 12/2004 | Nakata | 370/228 |
| 6,829,347 B1 | 12/2004 | Odiaka | 379/220.01 |
| 6,831,921 B2 | 12/2004 | Higgins | 370/401 |
| 6,842,706 B1 * | 1/2005 | Baraty | 702/61 |
| 6,845,091 B2 | 1/2005 | Ogier et al. | 370/338 |
| 6,865,185 B1 | 3/2005 | Patel et al. | 370/412 |
| 6,882,635 B2 | 4/2005 | Eitan et al. | 370/338 |
| 6,885,309 B1 | 4/2005 | Van Heteren | 340/870.11 |
| 6,891,838 B1 | 5/2005 | Petite et al. | 370/401 |
| 6,900,738 B2 | 5/2005 | Crichlow | 340/870.02 |
| 6,904,025 B1 | 6/2005 | Madour et al. | 370/328 |
| 6,904,385 B1 | 6/2005 | Budike, Jr. | 702/182 |
| 6,909,705 B1 | 6/2005 | Lee et al. | 370/338 |
| 6,963,285 B2 | 11/2005 | Fischer et al. | 340/635 |
| 6,967,452 B2 | 11/2005 | Aiso et al. | 318/466 |
| 6,970,771 B1 * | 11/2005 | Preiss et al. | 700/286 |
| 6,975,613 B1 | 12/2005 | Johansson | 370/338 |
| 6,980,973 B1 | 12/2005 | Karpenko | 705/412 |
| 6,982,651 B2 | 1/2006 | Fischer | 340/870.02 |
| 6,985,087 B2 | 1/2006 | Soliman | 340/870.02 |
| 7,000,021 B1 * | 2/2006 | Radhakrishnan et al. | 709/230 |
| 7,009,379 B2 | 3/2006 | Ramirez | 324/142 |
| 7,009,493 B2 | 3/2006 | Howard et al. | 340/7.1 |
| 7,016,336 B2 | 3/2006 | Sorensen | 370/351 |

| Patent No. | Date | Inventor | Class |
|---|---|---|---|
| 7,020,701 B1 | 3/2006 | Gelvin et al. | 709/224 |
| 7,053,853 B2 | 5/2006 | Merenda et al. | 343/820 |
| 7,054,271 B2 | 5/2006 | Brownrigg et al. | 370/238 |
| 7,062,361 B1 | 6/2006 | Lane | 700/295 |
| 7,064,679 B2 | 6/2006 | Ehrke et al. | 340/870.02 |
| 7,072,945 B1 | 7/2006 | Nieminen et al. | 709/217 |
| 7,102,533 B2 | 9/2006 | Kim | 340/870.02 |
| 7,103,086 B2 | 9/2006 | Steed et al. | 375/132 |
| 7,103,511 B2 | 9/2006 | Petite | 702/188 |
| 7,106,044 B1 | 9/2006 | Lee, Jr. et al. | 324/110 |
| 7,126,494 B2 | 10/2006 | Ardalan et al. | 340/870.02 |
| 7,135,956 B2 | 11/2006 | Bartone et al. | 340/3.9 |
| 7,143,204 B1 | 11/2006 | Kao et al. | 710/18 |
| 7,145,474 B2 | 12/2006 | Shuey et al. | 340/870.03 |
| 7,170,425 B2 | 1/2007 | Christopher et al. | 340/870.02 |
| 7,174,260 B2 | 2/2007 | Tuff et al. | 702/61 |
| 7,185,131 B2 | 2/2007 | Leach | 710/305 |
| 7,200,633 B2 | 4/2007 | Sekiguchi et al. | 709/203 |
| 7,209,840 B2 | 4/2007 | Petite et al. | 702/62 |
| 7,215,926 B2 | 5/2007 | Corbett et al. | 455/41.2 |
| 7,230,544 B2 | 6/2007 | Van Heteren | 340/870.03 |
| 7,230,931 B2 | 6/2007 | Struhsaker | 370/280 |
| 7,245,938 B2 | 7/2007 | Sobczak et al. | 455/562.1 |
| 7,248,861 B2 | 7/2007 | Lazaridis et al. | 455/414.1 |
| 7,250,874 B2 | 7/2007 | Mueller et al. | 340/870.06 |
| 7,251,570 B2 * | 7/2007 | Hancock et al. | 702/57 |
| 7,271,735 B2 | 9/2007 | Rogai | 340/870.02 |
| 7,274,305 B1 * | 9/2007 | Luttrell | 340/870.02 |
| 7,274,975 B2 | 9/2007 | Miller | 700/295 |
| 7,277,027 B2 | 10/2007 | Ehrke et al. | 340/870.12 |
| 7,289,887 B2 | 10/2007 | Rodgers | 700/295 |
| 7,301,476 B2 | 11/2007 | Shuey et al. | 340/870.03 |
| 7,304,587 B2 | 12/2007 | Boaz | 340/870.02 |
| 7,308,370 B2 | 12/2007 | Mason, Jr. et al. | 702/65 |
| 7,312,721 B2 | 12/2007 | Mason, Jr. et al. | 340/870.02 |
| 7,317,404 B2 | 1/2008 | Cumeralto et al. | 340/870.02 |
| 7,321,316 B2 | 1/2008 | Hancock et al. | 340/870.02 |
| 7,327,998 B2 | 2/2008 | Kumar et al. | 455/405 |
| 7,346,463 B2 | 3/2008 | Petite et al. | 702/62 |
| 7,349,766 B2 * | 3/2008 | Rodgers | 700/295 |
| 7,366,191 B2 | 4/2008 | Higashiyama | 370/406 |
| 7,379,981 B2 | 5/2008 | Elliott et al. | 709/220 |
| 7,451,019 B2 * | 11/2008 | Rodgers | 700/295 |
| 7,546,595 B1 | 6/2009 | Wickham et al. | 717/168 |
| 7,548,907 B2 * | 6/2009 | Wall et al. | 1/1 |
| 7,571,865 B2 | 8/2009 | Nicodem et al. | 236/51 |
| 7,733,224 B2 * | 6/2010 | Tran | 340/540 |
| 7,743,224 B2 | 6/2010 | Wang | 711/154 |
| 7,788,491 B1 | 8/2010 | Dawson | 713/168 |
| 7,802,245 B2 | 9/2010 | Sonnier et al. | 717/171 |
| 7,818,758 B2 | 10/2010 | de Bonet et al. | 719/328 |
| 7,822,944 B2 * | 10/2010 | Schuessler | 711/217 |
| 7,847,706 B1 * | 12/2010 | Ross et al. | 340/12.52 |
| 8,051,415 B2 | 11/2011 | Suzuki | 717/168 |
| 8,085,686 B2 * | 12/2011 | Thubert et al. | 370/254 |
| 2001/0005368 A1 | 6/2001 | Rune | 370/390 |
| 2001/0010032 A1 | 7/2001 | Ehlers et al. | 702/62 |
| 2001/0038342 A1 | 11/2001 | Foote | 340/870.02 |
| 2001/0046879 A1 | 11/2001 | Schramm et al. | 455/525 |
| 2002/0012358 A1 | 1/2002 | Sato | 370/466 |
| 2002/0051269 A1 | 5/2002 | Margalit et al. | 398/126 |
| 2002/0066095 A1 | 5/2002 | Yu | 717/173 |
| 2002/0110118 A1 | 8/2002 | Foley | 370/352 |
| 2002/0114303 A1 | 8/2002 | Crosbie et al. | 370/338 |
| 2002/0186619 A1 | 12/2002 | Reeves et al. | 368/47 |
| 2003/0001640 A1 | 1/2003 | Lao et al. | 327/165 |
| 2003/0014633 A1 | 1/2003 | Gruber | 713/170 |
| 2003/0037268 A1 | 2/2003 | Kistler | 713/310 |
| 2003/0123481 A1 | 7/2003 | Neale et al. | 370/466 |
| 2003/0207697 A1 | 11/2003 | Shpak | 455/524 |
| 2004/0031030 A1 | 2/2004 | Kidder et al. | 717/172 |
| 2004/0034773 A1 | 2/2004 | Balabine et al. | 713/168 |
| 2004/0039817 A1 | 2/2004 | Lee et al. | 709/225 |
| 2004/0081086 A1 | 4/2004 | Hippelainen et al. | 370/227 |
| 2004/0113810 A1 | 6/2004 | Mason, Jr. et al. | 340/870.02 |
| 2004/0117788 A1 | 6/2004 | Karaoguz et al. | 717/177 |
| 2004/0125776 A1 | 7/2004 | Haugli et al. | 370/338 |
| 2004/0138787 A1 | 7/2004 | Ransom et al. | 700/295 |
| 2004/0140908 A1 | 7/2004 | Gladwin et al. | 340/870.02 |
| 2004/0157613 A1 | 8/2004 | Steer et al. | 455/446 |
| 2004/0193329 A1 | 9/2004 | Ransom et al. | 700/286 |
| 2004/0268142 A1 | 12/2004 | Karjala et al. | 726/15 |
| 2005/0027859 A1 | 2/2005 | Alvisi et al. | 709/224 |
| 2005/0030968 A1 | 2/2005 | Rich et al. | 370/449 |
| 2005/0055432 A1 * | 3/2005 | Rodgers | 709/223 |
| 2005/0058144 A1 | 3/2005 | Ayyagari et al. | 370/401 |
| 2005/0065742 A1 | 3/2005 | Rodgers | 702/62 |
| 2005/0172024 A1 | 8/2005 | Cheifot et al. | 709/225 |
| 2005/0187928 A1 | 8/2005 | Byers | 1/1 |
| 2005/0193390 A1 | 9/2005 | Suzuki et al. | 717/178 |
| 2005/0195757 A1 * | 9/2005 | Kidder et al. | 370/278 |
| 2005/0228874 A1 | 10/2005 | Edgett et al. | 709/220 |
| 2005/0249113 A1 | 11/2005 | Kobayashi et al. | 370/219 |
| 2005/0251403 A1 | 11/2005 | Shuey | 705/1 |
| 2005/0257215 A1 | 11/2005 | Denby et al. | 717/172 |
| 2006/0056363 A1 | 3/2006 | Ratiu et al. | 370/338 |
| 2006/0056368 A1 | 3/2006 | Ratiu et al. | 370/338 |
| 2006/0098576 A1 | 5/2006 | Brownrigg et al. | 370/238 |
| 2006/0111111 A1 | 5/2006 | Ovadia | 455/439 |
| 2006/0130053 A1 | 6/2006 | Buljore et al. | 717/173 |
| 2006/0167784 A1 | 7/2006 | Hoffberg | 705/37 |
| 2006/0184288 A1 | 8/2006 | Rodgers | 700/295 |
| 2006/0215583 A1 | 9/2006 | Castagnoli | 370/254 |
| 2006/0215673 A1 | 9/2006 | Olvera-Hernandez | 370/406 |
| 2006/0217936 A1 | 9/2006 | Mason et al. | 702/188 |
| 2006/0271678 A1 * | 11/2006 | Jessup et al. | 709/224 |
| 2007/0001868 A1 | 1/2007 | Boaz | 340/870.02 |
| 2007/0019598 A1 | 1/2007 | Prehofer | 370/338 |
| 2007/0057767 A1 | 3/2007 | Sun et al. | 340/7.35 |
| 2007/0063866 A1 * | 3/2007 | Webb | 340/870.02 |
| 2007/0063868 A1 | 3/2007 | Borleske | 340/870.03 |
| 2007/0085700 A1 | 4/2007 | Walters et al. | 340/870.02 |
| 2007/0087756 A1 | 4/2007 | Hoffberg | 455/450 |
| 2007/0089110 A1 | 4/2007 | Li | 717/178 |
| 2007/0101442 A1 | 5/2007 | Bondurant | 726/34 |
| 2007/0103324 A1 | 5/2007 | Kosuge et al. | 340/618 |
| 2007/0109121 A1 | 5/2007 | Cohen | 340/539.26 |
| 2007/0136737 A1 | 6/2007 | Nguyen | 726/26 |
| 2007/0139220 A1 | 6/2007 | Mirza et al. | 340/870.02 |
| 2007/0147268 A1 | 6/2007 | Kelley et al. | 370/254 |
| 2007/0169074 A1 | 7/2007 | Koo et al. | 717/168 |
| 2007/0169075 A1 | 7/2007 | Lill et al. | 717/168 |
| 2007/0169080 A1 | 7/2007 | Friedman | 717/168 |
| 2007/0174467 A1 * | 7/2007 | Ballou et al. | 709/227 |
| 2007/0189249 A1 * | 8/2007 | Gurevich et al. | 370/338 |
| 2007/0200729 A1 | 8/2007 | Borleske et al. | 340/870.02 |
| 2007/0205915 A1 | 9/2007 | Shuey et al. | 340/870.02 |
| 2007/0206521 A1 | 9/2007 | Osaje | 370/315 |
| 2007/0207811 A1 | 9/2007 | Das et al. | 455/450 |
| 2007/0248047 A1 | 10/2007 | Shorty et al. | 370/329 |
| 2007/0258508 A1 | 11/2007 | Werb et al. | 375/140 |
| 2007/0266429 A1 | 11/2007 | Ginter et al. | 726/12 |
| 2007/0271006 A1 | 11/2007 | Golden et al. | 700/295 |
| 2007/0276547 A1 | 11/2007 | Miller | 700/295 |
| 2007/0276985 A1 * | 11/2007 | Schuessler | 711/100 |
| 2008/0011864 A1 * | 1/2008 | Tessier et al. | 236/51 |
| 2008/0132185 A1 | 6/2008 | Elliott et al. | 455/115.4 |
| 2008/0177678 A1 | 7/2008 | Di Martini et al. | 705/512 |
| 2008/0283620 A1 | 11/2008 | Knapp | 236/12.16 |
| 2008/0318547 A1 * | 12/2008 | Ballou et al. | 455/410 |
| 2009/0129575 A1 | 5/2009 | Chakroaborty et al. | 379/201.03 |
| 2009/0132220 A1 | 5/2009 | Chakroborty et al. | 703/13 |
| 2009/0134969 A1 * | 5/2009 | Veillette | 340/3.1 |
| 2009/0135677 A1 | 5/2009 | Veillette | 368/47 |
| 2009/0136042 A1 | 5/2009 | Veillette | 380/279 |
| 2009/0138777 A1 | 5/2009 | Veillette | 714/748 |
| 2009/0201936 A1 | 8/2009 | Dumet et al. | 370/401 |
| 2009/0310593 A1 | 12/2009 | Sheynblat et al. | 370/350 |
| 2010/0061272 A1 | 3/2010 | Veillette | 370/254 |
| 2010/0138660 A1 | 6/2010 | Haynes et al. | 713/171 |
| 2010/0238917 A1 | 9/2010 | Silverman et al. | 370/350 |
| 2011/0066297 A1 | 3/2011 | Saberi et al. | 700/287 |

FOREIGN PATENT DOCUMENTS

| | | |
|---|---|---|
| WO | WO 00/54237 | 9/2000 |
| WO | WO 01/26334 A2 | 4/2001 |
| WO | WO 01/55865 A1 | 8/2001 |
| WO | WO 2008/027457 | 3/2008 |

| | | | |
|---|---|---|---|
| WO | WO 2008/033287 A2 | 3/2008 | |
| WO | WO 2008/033514 A2 | 3/2008 | |
| WO | WO 2008/092268 A1 | 8/2008 | |
| WO | WO 2009/067251 | 5/2009 | |

OTHER PUBLICATIONS

Utility Intelligence, "Exclusive Distributors of Dynamic Virtual Metering" [online], Copyright 2004-2005 [retrieved on May 12, 2005], Retrieved from the Internet: http://www.empoweringutilities.com/hardware.html, 29 pp.
"AMRON Meter Management System" [online], [retrieved on May 12, 2005], 41 pp., Retrieved from the Internet: http://www.amronm5.com/products/.
International Search Report and Written Opinion for Application No. PCT/US08/12161, dated Mar. 2, 2009, 13 pp.
International Search Report and Written Opinion for Application No. PCT/US08/13017, dated Mar. 18, 2009, 11 pp.
International Search Report and Written Opinion for Application No. PCT/US08/13032, dated May 12, 2009, 14 pp.
International Search Report and Written Opinion for Application No. PCT/US08/13026, dated Feb. 24, 2009, 9 pp.
International Search Report and Written Opinion for Application No. PCT/US08/13029, dated Feb. 2, 2009, 8 pp.
Reexamination U.S. Appl. No. 90/008,011, filed Jul. 24, 2006, 75 pp.
Broch, Josh, et al., "A Performance Comparison of Multi-Hop Wireless Ad Hoc Network Routing Protocols," *Proceedings of the Fourth Annual ACM/IEEE International Conference in Mobile Computing and Networking (MobiCom '98)*, Dallas, Texas, 13 pp., Oct. 25-30, 1998.
Broch, Josh, et al., "The Dynamic Source Routing Protocol for Mobile Ad Hoc Networks" [online], Mar. 13, 1998 [retrieved on Feb. 24, 2009], 31 pp., Retrieved from the Internet: http://tools.ietf.org/draft-ietf-manet-dsr-00.txt.
Katz, Randy H. and Brewer, Eric A., "The Case for Wireless Overlay Networks," *Electrical Engineering and Computer Science Department, University of California, Berkeley*, 12 pp., 1996.
Johnson, David B., "Routing in Ad Hoc Networks of Mobile Hosts," *IEEE*, pp. 158-163, 1995.
International Search Report and Written Opinion for Application No. PCT/US08/13027, dated Feb. 9, 2009, 6 pp.
International Search Report and Written Opinion for Application No. PCT/US08/13023, dated Jan. 12, 2009, 10 pp.
International Search Report and Written Opinion for Application No. PCT/US08/13019, dated Jan. 12, 2009, 13 pp.
International Search Report and Written Opinion for Application No. PCT/US08/13025, dated Jan. 13, 2009, 7 pp.
International Search Report and Written Opinion for Application No. PCT/US08/13018, dated Jan. 30, 2009, 9 pp.
International Search Report and Written Opinion for Application No. PCT/US08/13020, dated Jan. 9, 2009, 8 pp.
International Search Report and Written Opinion for Application No. PCT/US08/13028, dated Jan. 15, 2009, 9 pp.
International Search Report and Written Opinion for Application No. PCT/US08/13021, dated Jan. 15, 2009, 11 pp.
International Search Report and Written Opinion for Application No. PCT/US08/13016, dated Jan. 9, 2009, 7 pp.
International Search Report and Written Opinion for Application No. PCT/US08/13024, dated Jan. 13, 2009, 9 pp.
International Search Report and Written Opinion for Application No. PCT/US08/13022, dated Jan. 27, 2009, 10 pp.
International Search Report and Written Opinion for Application No. PCT/US08/13030, dated Jan. 9, 2009, 7 pp.
Hydro One Networks, Inc., Request for Proposal for Smart Metering Services, 16 pp., Mar. 4, 2005.
Trilliant Networks, "The Trilliant AMI Solution," RFP SCP-07003, 50 pp., Mar. 22, 2007.
"ZigBee Smart Energy Profile Specification," ZigBee Profile 0x0109, Revision 14, Document 075356r14, 202 pp., May 29, 2008.
Hubaux, J. P., et al. "Towards Mobile Ad-Hoc WANs: Terminodes," 2000 IEEE, Wireless Communications and Networking Conference, WCNC, vol. 3, pp. 1052-1059, 2000.

Miklos, G., et al., "Performance Aspects of Bluetooth Scatternet Formation," First Annual Workshop on Mobile and Ad Hoc Networking and Computing, MobiHOC 2000, pp. 147-148, 2000.
Eng, K. Y., et al. "BAHAMA: A Broadband Ad-Hoc Wireless ATM Local-Area Network," 1995 IEEE International Conference on Communications, ICC '95 Seattle, 'Gateway to Globalization', vol. 2, pp. 1216-1223, Jun. 18-22, 1995.
Lee, David J. Y., "Ricocheting Bluetooth," 2nd International Conference on Microwave and Millimeter Wave Technology Proceedings, ICMMT 2000, pp. 432-435, 2000.
Lilja, Tore, "Mobile Energy Supervision," Twenty-second International Telecommunications Energy Conference, 2000 INTELEC, pp. 707-712, 2000.
Parkka, Juha, et al., "A Wireless Wellness Monitor for Personal Weight Management," Proceedings of the 2000 IEEE EMBS International Conference on Information Technology Applications in Biomedicine, pp. 83-88, 2000.
Broch, J., et al., "Supporting Hierarchy and Heterogeneous Interfaces in Multi-Hop Wireless Ad Hoc Networks," Proceedings of the Fourth International Symposium on Parallel Architectures, Algorithms, and Networks (I-SPAN '99), pp. 370-375 (7 pp. with Abstract), Jun. 23-25, 1999.
Privat, G., "A System-Architecture Viewpoint on Smart Networked Devices," Microelectronic Engineering, vol. 54, Nos. 1-2, pp. 193-197, Dec. 2000.
Jonsson, U., et al., "MIPMANET—Mobile IP for Mobile Ad Hoc Networks," MobiHOC 2000, First Annual Workshop on Mobile and Ad Hoc Networking and Computing, pp. 75-85 (12 pp. with Abstract), 2000.
Kapoor, R., et al., "Multimedia Support Over Bluetooth Piconets," First Workshop on Wireless Mobile Internet, pp. 50-55, Jul. 2001.
Sung-Yuan, K., "The Embedded Bluetooth CCD Camera," TENCON, Proceedings of the IEEE Region 10 International Conference on Electrical and Electronic Technology, vol. 1, pp. 81-84 (5 pp. with Abstract), Aug. 19-22, 2001.
Lim, A., "Distributed Services for Information Dissemination in Self-Organizing Sensor Networks," Journal of the Franklin Institute, vol. 338, No. 6, pp. 707-727, Sep. 2001.
Meguerdichian, S., et al., "Localized Algorithms in Wireless Ad-Hoc Networks: Location Discovery and Sensor Exposure," ACM Symposium on Mobile Ad Hoc Networking & Computing, MobiHOC 2001, pp. 106-116, Oct. 2001.
Lilakiatsakun, W., et al. "Wireless Home Networks Based on a Hierarchical Bluetooth Scatternet Architecture," Proceedings of the Ninth IEEE International Conference on Networks, pp. 481-485 (6 pp. with Abstract), Oct. 2001.
Jha, S., et al., "Universal Network of Small Wireless Operators (UNSWo)," Proceedings of the First IEEE/ACM International Symposium on Cluster Computing and the Grid, pp. 626-631 (7 pp. with Abstract), 2001.
International Search Report and Written Opinion for Application No. PCT/US2011/060694, dated Apr. 9, 2012, 10 pp.
International Search Report and Written Opinion for Application No. PCT/US2011/049227, dated Jan. 31, 2012, 9 pp.
International Search Report and Written Opinion for Application No. PCT/US12/22334, dated Apr. 9, 2012, 9 pp.
International Search Report and Written Opinion for Application No. PCT/US11/56620, dated Mar. 13, 2012, 8 pp.
Supplementary European Search Report for Application No. EP 08 84 2449, dated Nov. 29, 2011, 5 pp.
Lin, Shen, et al., "A Wireless Network Based on the Combination of Zigbee and GPRS" [online], [retrieved on Feb. 16, 2012], IEEE International Conference on Networking, Sensing and Control, Apr. 6-8, 2008, 4 pp., Retrieved From the Internet: http://ieeexplore.ieee.org/xpls/abs_all.jsp?arnumber=4525223.
Telegesis, "ZigBee Gateway Makes Your Meter Smart" [online], 2005 [retrieved on Feb. 16, 2012], 1 p., Retrieved From the Internet: http://www.telegesis.com/downloads/general/SSV%20IP%20gateway%20case%20study.pdf.
Supplementary European Search Report for Application No. EP 09 81 1849, dated Dec. 13, 2011, 9 pp.

Gerla, Mario, et al., Multicasting Protocols for High-Speed, Wormhole-Routing Local Area Networks, ACM SIGCOMM Computer Communication Review, vol. 26, No. 4, Oct. 4, 1996, pp. 184-193.

International Search Report and Written Opinion for Application No. PCT/US2011/049277, dated Jan. 31, 2012, 9 pp..

International Search Report and Written Opinion for Application No. PCT/US11/21167, dated Mar. 21, 2012, 8 pp.

"UCAIug Home Area Network System Requirements Specification, A Work Product of the OpenHAN Task Force Formed by the SG Systems Working Group Under the Open Smart Grid (OpenSG) Technical Committee of the UCA® International Users Group, Version 2.0," 157 pp., Aug. 30, 2010.

"ZigBee Smart Energy Profile Specification," ZigBee Profile: 0x0109, Revision 15, Dec. 1, 2008, Document 075345r15 (SEP Document), 244 pp.

Edison Electric Institute (EEI), "Uniform Business Practices for Unbundled Electricity Metering, vol. Two," Dec. 5, 2000, 196 pp., www.naesb.org/pdf/ubp120500.pdf.

"ZigBee Smart Energy Profile Specification," ZigBee Profile: 0x0109, Revision 16, Version 1.1, Document 075356r16ZB, 332 pp., Mar. 23, 2011.

"ZigBee Over-the-Air Upgrading Cluster," ZigBee Alliance, Document 095264r18, Revision 18, Version 1.0, 63 pp., Mar. 14, 2010.

IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (WPANs)," IEEE Computer Society, 323 pp., Sep. 8, 2006.

IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (LR-WPANs)," IEEE Computer Society, 679 pp., Oct. 1, 2003.

"ZigBee Cluster Library Specification," ZigBee Alliance, Document 075123r02ZB, 420 pp., May 29, 2008.

Liu, Ryan, et al., "A Survey of PEV Impacts on Electric Utilities," *EEE PES Innovative Smart Grid Technologies Conference*, Anaheim, California, 8 pp., Jan. 17-19, 2011.

"Utility/Lab Workshop on PV Technology and Systems," DTE Energy DER Technology Adoption, DEW Analysis of Renewable, PEV & Storage, Tempe, Arizona, 36 pp., Nov. 8-9, 2010.

"Network Device: Gateway Specification," ZigBee Alliance, ZigBee Document 075468r35, Revision 35, Version No. 1.0, 301 pp., Mar. 23, 2011.

\* cited by examiner

SYSTEM AND METHOD FOR TRANSMITTING AND RECEIVING INFORMATION ON A NEIGHBORHOOD AREA NETWORK

CROSS-REFERENCE TO RELATED APPLICATIONS

This application claims the benefit of priority to the following United States provisional patent applications which are incorporated herein by reference in their entirety:

Ser. No. 60/989,957 entitled "Point-to-Point Communication within a Mesh Network", filed Nov. 25, 2007;

Ser. No. 60/989,967 entitled "Efficient And Compact Transport Layer And Model For An Advanced Metering Infrastructure (AMI) Network," filed Nov. 25, 2007;

Ser. No. 60/989,958 entitled "Creating And Managing A Mesh Network Including Network Association," filed Nov. 25, 2007;

Ser. No. 60/989,964 entitled "Communication and Message Route Optimization and Messaging in a Mesh Network," filed Nov. 25, 2007;

Ser. No. 60/989,950 entitled "Collector Device and System Utilizing Standardized Utility Metering Protocol," filed Nov. 25, 2007;

Ser. No. 60/989,953 entitled "System And Method For Real Time Event Report Generation Between Nodes And Head End Server In A Meter Reading Network Including From Smart And Dumb Meters," filed Nov. 25, 2007;

Ser. No. 60/989,975 entitled "System and Method for Network (Mesh) Layer And Application Layer Architecture And Processes," filed Nov. 25, 2007;

Ser. No. 60/989,971 entitled "Response Devices Providing Inter-Device Communication For Neighborhood Area Network (NAN)," filed Nov. 25, 2007;

Ser. No. 60/989,966 entitled "System And Method For Demand Response Devices Providing Requests For Information To Inform A Consumer," filed Nov. 25, 2007;

Ser. No. 60/989,959 entitled "Tree Routing Within a Mesh Network," filed Nov. 25, 2007;

Ser. No. 60/989,961 entitled "Source Routing Within a Mesh Network," filed Nov. 25, 2007;

Ser. No. 60/989,962 entitled "Method and System for Creating and Managing Association and Balancing of a Mesh Device in a Mesh Network," filed Nov. 25, 2007;

Ser. No. 60/989,951 entitled "Network Node And Collector Architecture For Communicating Data And Method Of Communications," filed Nov. 25, 2007;

Ser. No. 60/989,955 entitled "System And Method For Recovering From Head End Data Loss And Data Collector Failure In An Automated Meter Reading Infrastructure," filed Nov. 25, 2007;

Ser. No. 60/989,952 entitled "System And Method For Assigning Checkpoints To A Plurality Of Network Nodes In Communication With A Device Agnostic Data Collector," filed Nov. 25, 2007;

Ser. No. 60/989,954 entitled "System And Method For Synchronizing Data In An Automated Meter Reading Infrastructure," filed Nov. 25, 2007;

Ser. No. 60/992,312 entitled "Mesh Network Broadcast," filed Dec. 4, 2007;

Ser. No. 60/992,313 entitled "Multi Tree Mesh Networks", filed Dec. 4, 2007;

Ser. No. 60/992,315 entitled "Mesh Routing Within a Mesh Network," filed Dec. 4, 2007;

Ser. No. 61/025,279 entitled "Point-to-Point Communication within a Mesh Network", filed Jan. 31, 2008, and which are incorporated by reference.

Ser. No. 61/025,270 entitled "Application Layer Device Agnostic Collector Utilizing Standardized Utility Metering Protocol Such As ANSI C12.22," filed Jan. 31, 2008;

Ser. No. 61/025,276 entitled "System And Method For Real-Time Event Report Generation Between Nodes And Head End Server In A Meter Reading Network Including Form Smart And Dumb Meters," filed Jan. 31, 2008;

Ser. No. 61/025,282 entitled "Method And System for Creating And Managing Association And Balancing Of A Mesh Device In A Mesh Network," filed Jan. 31, 2008;

Ser. No. 61/025,271 entitled "Method And System for Creating And Managing Association And Balancing Of A Mesh Device In A Mesh Network," filed Jan. 31, 2008;

Ser. No. 61/025,287 entitled "System And Method For Operating Mesh Devices In Multi-Tree Overlapping Mesh Networks", filed Jan. 31, 2008;

Ser. No. 61/025,278 entitled "System And Method For Recovering From Head End Data Loss And Data Collector Failure In An Automated Meter Reading Infrastructure," filed Jan. 31, 2008;

Ser. No. 61/025,273 entitled "System And Method For Assigning Checkpoints to A Plurality Of Network Nodes In Communication With A Device-Agnostic Data Collector," filed Jan. 31, 2008;

Ser. No. 61/025,277 entitled "System And Method For Synchronizing Data In An Automated Meter Reading Infrastructure," filed Jan. 31, 2008;

Ser. No. 61/050,538 entitled "System And Method For Transmitting And Receiving Information On A Neighborhood Area Network," filed May 5, 2008; and Ser. No. 61/094,116 entitled "Message Formats and Processes for Communication Across a Mesh Network," filed Sep. 4, 2008.

This application hereby references and incorporates by reference each of the following United States patent applications filed contemporaneously herewith:

Ser. No. 12/275,236 entitled "Point-to-Point Communication within a Mesh Network", filed Nov. 21, 2008;

Ser. No. 12/275,305 entitled "Efficient And Compact Transport Layer And Model For An Advanced Metering Infrastructure (AMI) Network," filed Nov. 21, 2008;

Ser. No. 12/275,238 entitled "Route Optimization Within A Mesh Network," filed Nov. 21, 2008;

Ser. No. 12/275,242 entitled "Application Layer Device Agnostic Collector Utilizing ANSI C12.22," filed Nov. 21, 2008;

Ser. No. 12/275,252 entitled "Creating and Managing a Mesh Network," filed Nov. 21, 2008; and Ser. No. 12/275,257 entitled "System And Method For Operating Mesh Devices In Multi-Tree Overlapping Mesh Networks", filed Nov. 21, 2008.

FIELD OF THE INVENTION

The field of the invention pertains to communication systems and more particularly to storage and transmission of data over a network.

BACKGROUND

In a building, many devices use energy. Frequently, such devices use electrical energy but may also use liquid natural gas, propane, or other energy types. Washing machines, dishwashers, thermostats, and pool pumps, other home appliances, computers, office and business machines, are some examples of energy using devices. There are of course many more. The use of the devices is normally controlled by an individual and the devices are used as needed. Individuals often have no idea of the amount of energy used until they receive their energy bill. Such use is not usually monitored or recorded.

A user does not typically conform, control, or modify his or her energy use to pricing, time of day, consumption level, or other factors. Such a user does not typically have information as to the amount of energy that she has used or is currently using. For example, a user might realize that a dishwasher was operating but might not be aware, give the time of day, or energy pricing at that time of day, what the actual cost of the energy consumed over the selected dishwasher cycle would be then (e.g., 6:00 pm), or as compared, for example, to some other time of day (e.g. 3:00 am). However, a user could conform or modify use of energy if such information was made available to the user, particularly if such information was readily available in an understandable form at the time of use (or when a decision as to use was needed) without significant effort. However, at least some devices would additionally need to be able to communicate with each other, or to some central device or unit, so as to provide energy use information to the user and to allow for control of the energy using devices.

One problem with monitoring and displaying information used by energy using devices is that devices tend to be located at various distances from each other without any communications lines connecting the devices together.

What is needed is a system and method that provides data transmission between such devices that can store information from energy using devices and retrieve information for display to a display device that may be viewed by a user. The energy use information should be available to a user so that the user may control or modify energy use.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

At times, a device may require access to the data stored by other devices in a home or building in a neighborhood network. "Neighborhood" is not limited to residential neighborhoods, and extends to cover commercial areas, units and rural locations as well. Devices recording data can provide the data to another device for display to a user. The user can then use the information to make decisions about how and when to conform, control, or modify energy use. The device can include a wireless radio, or alternatively, may include a wired connection to communicate with other devices. A communications logic unit associated with the radio can format messages including data from a data storage unit. The radio, the communications logic unit, and the data storage unit can operate in accordance with standards governing their operation.

In one non-limiting aspect, there may be provided a device comprising: a data storage unit storing data in an extended table including home energy use information; a communications logic unit coupled to the radio operable to read data from the extended table and format the data as a message including the energy use information; and a radio to transmit the message.

In one non-limiting aspect, there may be provided a device comprising: an electricity meter reporting energy use information collected by the electricity meter; a data storage unit storing data in an extended table including home energy use information collected from the electricity meter and mesh radio information used to transmit the data over a NAN; a communications logic unit having an address on a NAN coupled to the radio and operable to read data from the extended table and format the data as a message including the energy use information according to the mesh radio information; and a radio to transmit the message to another device on the NAN.

In one non-limiting aspect, there may be provided a method comprising: providing a request to write data to an extended table; formatting the request as a message including a request code field, a table identifier, a count, and a data field; and transmitting the message via a radio.

In one non-limiting aspect, there may be provided a method comprising: providing a request to read data from an extended table; formatting the request as a message including a request code field, a table identifier, and a count; and transmitting the request via radio.

In one non-limiting aspect, there may be provided a method comprising: generating a request to write data to an extended table wherein: the write request is formatted as a write request message including a request code field, a table identifier, a count, and a data field; and transmitting the write request message via a radio; generating a request to read data from the extended table, wherein: the read request is formatted as a read request message including a request code field, a table identifier, and a count; and transmitting the read request message via a radio; and the generating of the request to write data and the generating of the request to read data may take place in any order.

In one non-limiting aspect, there may be provided a computer program stored in a computer readable form for execution in a processor and a processor coupled memory to implement a method comprising: providing a request to write data to an extended table; formatting the request as a message including a request code field, a table identifier, a count, and a data field; and transmitting the message over a radio.

In one non-limiting aspect, there may be provided a computer program stored in a computer readable form for execution in a processor and a processor coupled memory to implement a method comprising: providing a request to read data from an extended table; formatting the request as a message including a request code field, a table identifier, and a count; and transmitting the request via radio.

In one non-limiting aspect, there may be provided a computer program stored in a computer readable form for execution in a processor and a processor coupled memory to implement a method comprising: generating a request to write data to an extended table wherein: the write request is formatted as a write request message including a request code field, a table identifier, a count, and a data field; and transmitting the write request message via a radio; generating a request to read data from the extended table, wherein: the read request is formatted as a read request message including a request code field, a table identifier, and a count; and transmitting the read request message via a radio; and the generating of the request to write data and the generating of the request to read data may take place in any order.

This Summary introduces concepts in a simplified form that are described more fully below in the Detailed Description. This Summary is not intended to identify key or essential features of the claimed subject matter, nor is it intended to be used to limit the scope of the claimed subject matter.

DETAILED DESCRIPTION

Figure 1:
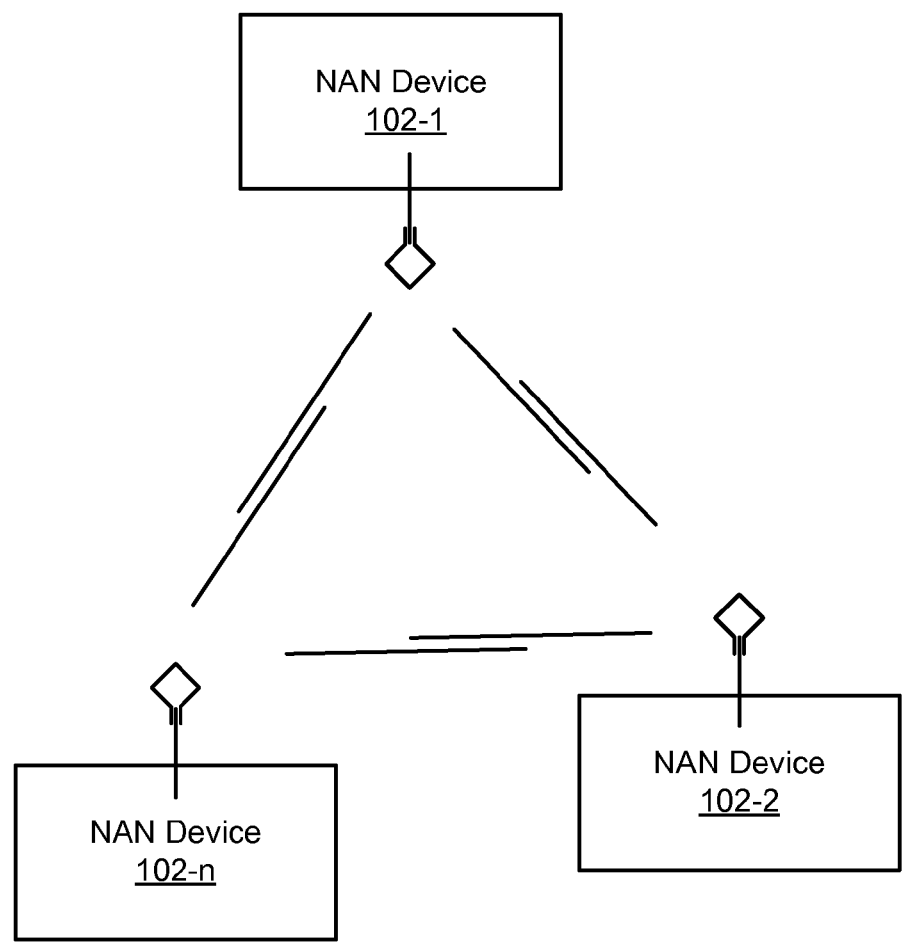
FIG. 1 depicts an example system including devices on a Neighborhood Area Network (NAN) transmitting and receiving data.

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring inventive aspects of various examples disclosed herein.

To overcome the problems described relative to conventional systems, devices, and methods above, the techniques introduced here allow for data storage, retrieval and transmission throughout a neighborhood area network. A device storing data can retrieve the data from an extended table and send the data as a message to another device that is similarly situated. Transmissions can be routed through wireless communication over a mesh network including devices located in various homes and buildings without the use of wires connecting the units. Advantageously, users are allowed to view the information and make decisions about energy use.

As used herein a "head end system" is a central processing system including one or more computing systems, and may for example include one or more server computers. Where the head end system includes more than one computing system, the computing systems can be connected by one or more networks. Typically the head end system is connected by a wired, wireless or combination of wired and wireless networks to a plurality of devices on a neighborhood area network.

As used herein, a "neighborhood area network" (NAN) may be a mesh network of devices transmitting data to each other. A mesh network includes a number of devices, wireless or wired, that transmit information from a source device to a destination device via one or more intermediate devices which relay the information toward the target device. A device on the NAN typically exists to serve an additional purpose other than to store, transmit and receive information, for example, as an electricity meter, a thermostat, an in home display, or other device useful relating to energy use. Advantageously, the NAN devices store energy use information.

As used herein, ANSI C12.19 refers to the American National Standard for Utility Industry End device Data Tables, published by the National Electrical Manufacturers Association in 2007, which is herein incorporated by reference as well as extensions and revisions to the original version.

As used herein, ANSI C12.22 refers to the American National Standard Protocol Specification For Interfacing Data Communication Networks: C12.22, published by the National Electrical Manufacturers Association in 2007, which is herein incorporated by reference, as well as extensions and revisions to the original version.

As used herein, IEEE 802.15 refers to the specification produced by the 15th working group of the Institute of Electrical and Electronics Engineers, published in 2003, and herein incorporated by reference, including all extensions and revisions to the original version.

As used herein, a "computer readable medium" or "machine readable medium" is any known or convenient machine manufacture or composition of matter capable of storing instructions or data thereon.

FIG. 1 depicts an example of a system including devices on a Neighborhood Area Network (NAN) transmitting and receiving data. FIG. 1 includes NAN Device 102-1, NAN Device 102-2, and NAN Device 102-*n* (collectively NAN devices 102). The NAN may include more or fewer devices, though at least two devices may be needed to support intra-NAN communication.

The NAN devices 102 may be hardware units, embedded devices, specially adapted computing systems, or other known or convenient units for storing, retrieving and transmitting data. The NAN devices 102 are typically coupled to a device performing a function, such as an electricity meter, an in-home display, a pool pump, a dishwasher, a thermostat, and any other known or convenient energy using device that may provide or produce energy consumption and/or use information. The NAN devices can be coupled to or included in the devices producing energy consumption and/or use information. The NAN devices 102 can be powered by connection to the energy using devices, or can separately derive power from, e.g. a battery or a standard electrical connection, photovoltaic or solar power source, or any other power source or supply.

Figure 2:
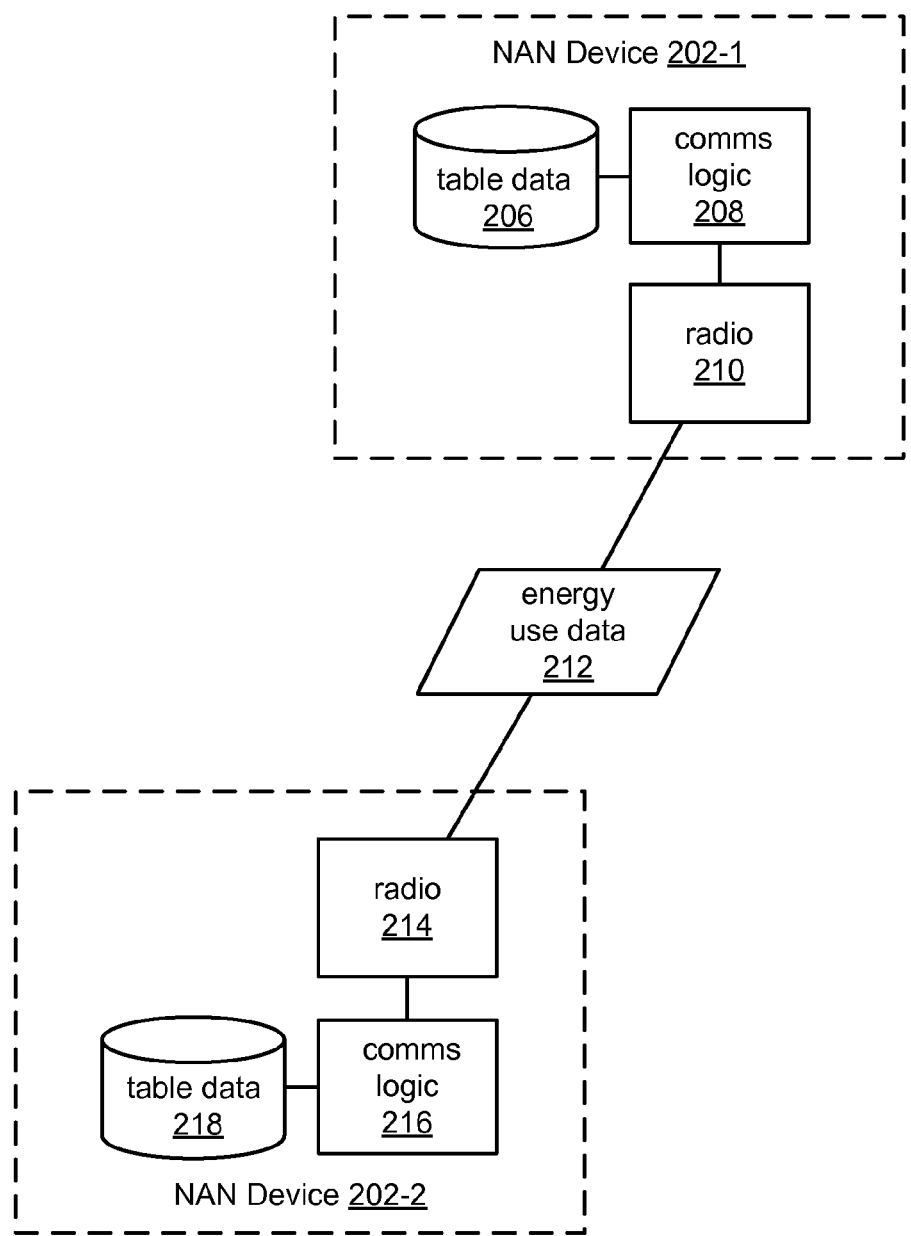
FIG. 2 depicts an example system including devices on a Neighborhood Area Network (NAN) transmitting and receiving data.

FIG. 2 depicts an example of a system including devices on a Neighborhood Area Network (NAN) transmitting and receiving data. FIG. 2 includes NAN Device 202-1 and NAN Device 202-2. NAN device 202-1 includes table data 206, communication or "comms" logic 208, and radio 210. NAN device 202-2 includes radio 214, comms logic 216, and energy use data 218. In the example of FIG. 2, the NAN Device 202-1 and the NAN device 202-2 can be NAN devices as described above in reference to FIG. 1.

In the example of FIG. 2, the table data 206 and the table data 218 each include standard tables and may include extended tables. As used herein, a "standard table" is a table common to all devices on a neighborhood area network (NAN), whereas an "extended table" can include information specific to an individual class or group of devices. The data tables 206 can store data in records entered into a database, as data objects stored in a data structure, or in any known or convenient manner.

Examples of standard tables are: general configuration, manufacturer identification, mode and status, additionally any table common to all devices on a NAN can be included as a standard table.

Examples of extended tables can include framework identification, GPS coordinates, firmware information, MESH radio identification, and other extended tables adapted to store information for use by devices on a NAN such as those transmitting data over a MESH network.

In the example of FIG. 2, the comms or communication logic 208 and the comms logic 216 can each generate messages to transmit data in a serial protocol defining messages, commands, service requests, responses and other known and convenient messages. The services can provide such high level operations as firmware upgrades, message encryption, reporting and other known or convenient functionality.

In the example of FIG. 2, the comms logic 216 and the comms logic 208 each include services used to retrieve, store and transmit data to and from tables. Any known or convenient language can be used to create the services. Services provided by the comms logic 216 and the comms logic 208 generally include services to read table data and to write table data. For example, a full read table service can acquire all table information for example, a table identifier, a number of bytes of data, a variable length data field including the table data, and a checksum to validate transmitted data.

In the example of FIG. 2, the radio 214 and the radio 210 can include any combination of electrical components, such as transistors, resistors, capacitors interconnected to provide for transmission of data. The radio 214 and the radio 210 can be configured to transmit data to the IEEE 802.15.4 protocol, and additionally any other known or convenient protocol.

In the example of FIG. 2, the energy use data 212 includes information or data, such as information or data to be displayed to a user, reported to a head end system, stored or otherwise used to monitor or control energy use. The energy use information can be related to a device coupled to either of the NAN Devices 202. The energy use data 212 can be transmitted from either the NAN device 202-1 to the NAN Device 202-2 or from the NAN Device 202-2 to the NAN Device 202-1. The specific example discussed below assumes, for the purposes of example, that information or data is transmitted from the NAN Device 202-1 to the NAN Device 202-2.

In the example of FIG. 2, in operation, the NAN Device 202-1 initiates a procedure to transmit data stored in an extended table in table data 206 to NAN Device 202-2. Comms logic 208 retrieves an identifier and data from the extended table in the table data 206 and formats it as a message including the identifier and the table as a variable length field. The comms logic 208 may include a count specifying the number of bytes included in the variable length field. Also, the comms logic 208 may include a checksum field to validate the data in the variable length data field to ensure that the data was not corrupted in transmission. The message may then be transmitted by the radio 210 to the NAN Device 202-2 as energy use data 212. The radio 214 receives the message on behalf of the NAN Device 202-2 and the comms logic 216 calculates the checksum to validate the data included in the message. The comms logic 216 reads the table identifier included in the message and saves the data to the table data 218.

Figure 3:
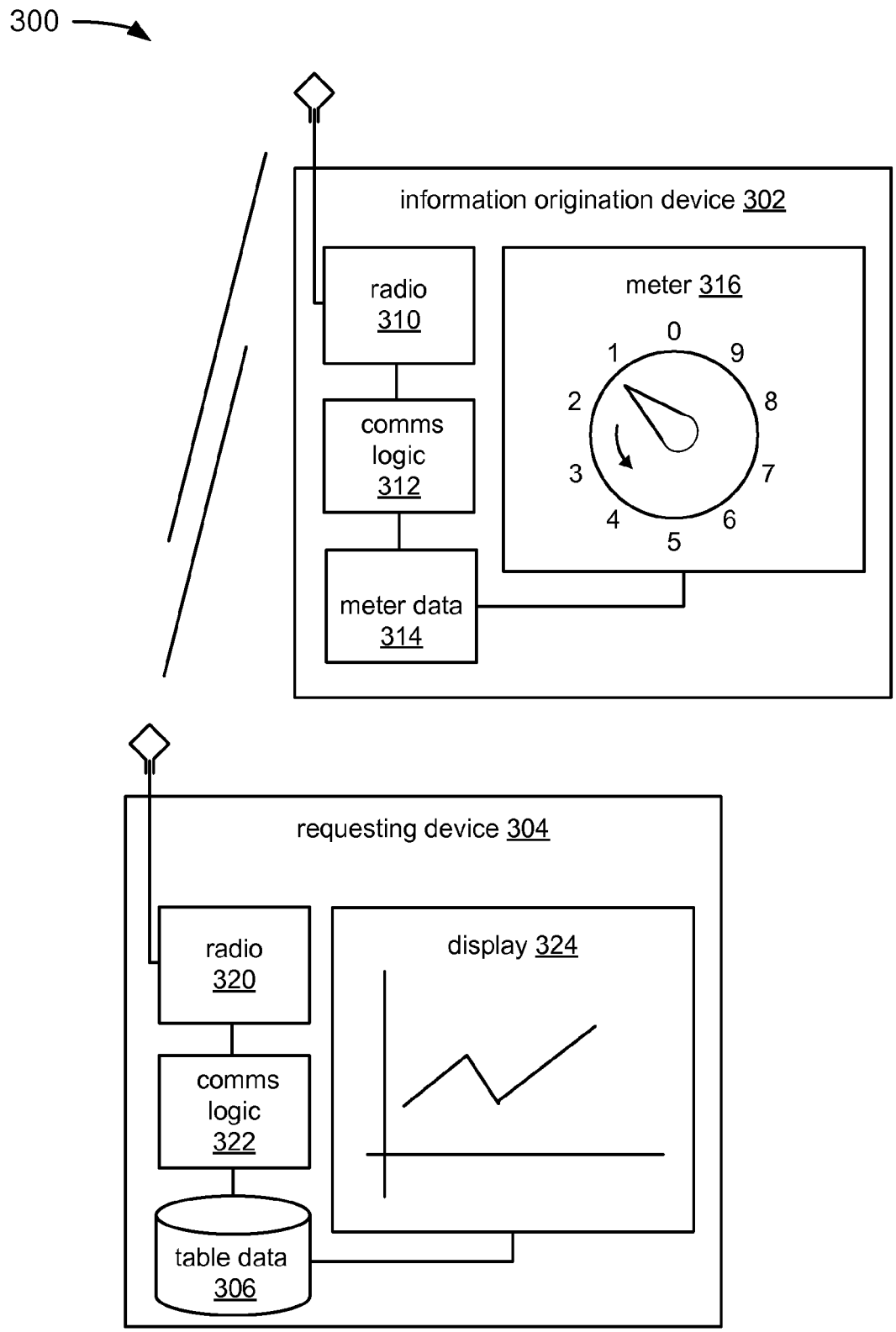
FIG. 3 depicts an example of a first NAN device coupled to a meter transmitting energy use information to a NAN requesting device for display.

FIG. 3 depicts a system including an information origination device, and a requesting device. FIG. 3 includes an information origination device 302 and a requesting device 304.

The information origination device 302 includes a radio 310, a communications (comms) logic unit 312, meter data 314, and meter 316.

In operation, the meter 316 produces meter data stored in the meter data storage 314 according to the ANSI C12.19 format, however, any known or convenient message formatting standard may be used. The comms logic 312 formats a message including meter data according to the ANSI C12.22 format, however, any known or convenient message formatting standard may be used. The radio 310 transmits the message using the IEEE 802.15.4 standard, or any other known or convenient standard.

The requesting device 304 includes a radio 320, communications (comms) logic 322, and display 324.

In operation, the radio 320 provides a request for meter data. The radio receives a message including meter data, and the comms logic provides the meter data to display 324. Display 324 may include additional processing and memory displaying meter data. User input may be provided as well.

Figure 4:
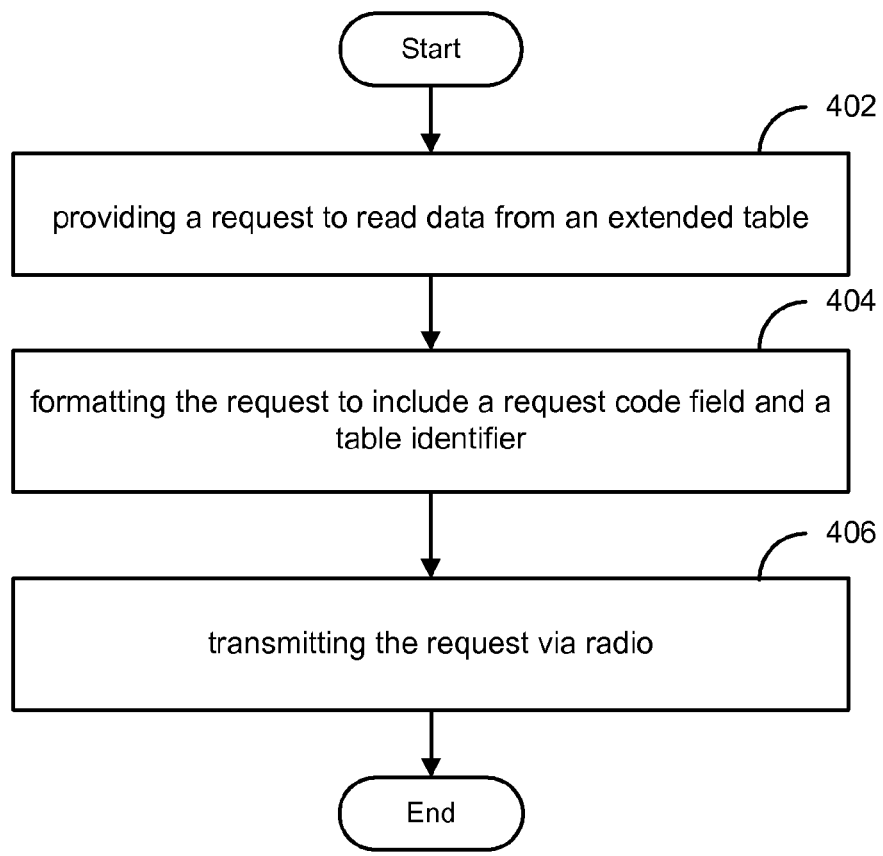
FIG. 4 depicts a flowchart of an example process for requesting data.

FIG. 4 depicts a flowchart of an example of a process for requesting data. The process 400 is organized as a sequence of modules or steps in the flowchart. However, it should be understood that these and modules associated with other methods described herein may be reordered for parallel execution or into different sequences of modules or steps.

In the example of FIG. 4, the process for requesting data 400 starts at module or step 402 with providing a request to read data from an extended table. The request can be received from an external NAN device, as part of, e.g., updating the device, reporting data to a head end system, displaying information to a user, or another known or convenient purpose. The request can identify a destination device to which the data is to be transmitted.

In the example of FIG. 4, the process for requesting data 400 continues to module or step 404 with formatting the request to include a request code field and a table identifier. The requesting device can indicate the nature of the request, for example, to read an entire table or to read a part of a table. The request code can specify the type of request and an amount of data to read, for example, a whole table, the request code can indicate that the entire table should be read, or alternatively the request code can indicate that, for example, 8 kb should be read from a table starting at an offset of 16 k or according to some other read instruction or strategy. The table identifier can indicate which table the read should be made from, for example, an extended table directed to the number of kilowatts used by a device in a time period can be stored in an extended table. The table can be identified as, for example, table 450, and the code can be included in the message. Other examples of tables could be General configuration, Manufacturer identification, Mode and status, Procedure initiate, Procedure response, Actual security, Access control, Extended key, Identification, Framework identification, Date time, Bar code, Framework test data, Device statistic, Scratchpad, Report list status, Report list, LAN control, LAN statistic, MeshGate update report, GPS coordinates, LAN radio provisioning, Key IDs lookup, LAN diagnostic statistic, Report ctrl, Event ctrl, Program check, Firmware download info, Firmware download status, Firmware scratchpad, MESH radio version, Framework firmware info, Information report, and any other known or convenient table. The structure for a table can be defined in accordance with the ANSI C12.19 specification, and any other known or convenient table structure can be used.

In the example of FIG. 4, the process for requesting data 400 continues to module or step 406 with transmitting the request via radio. The request can be included in a message and transmitted using any known or convenient protocol, such as the IEEE 802.15.4 protocol. The request is delivered either directly or indirectly via a MESH network to a destination device. In the context of a MESH network, one or more devices can re-transmit the message to the destination device. Therein, one or more devices could be connected by wired connection. The message itself can be re-transmitted several times using one or more protocols. Having transmitted the request via radio, the exemplary process 400 set forth in the flowchart terminates.

Figure 5:
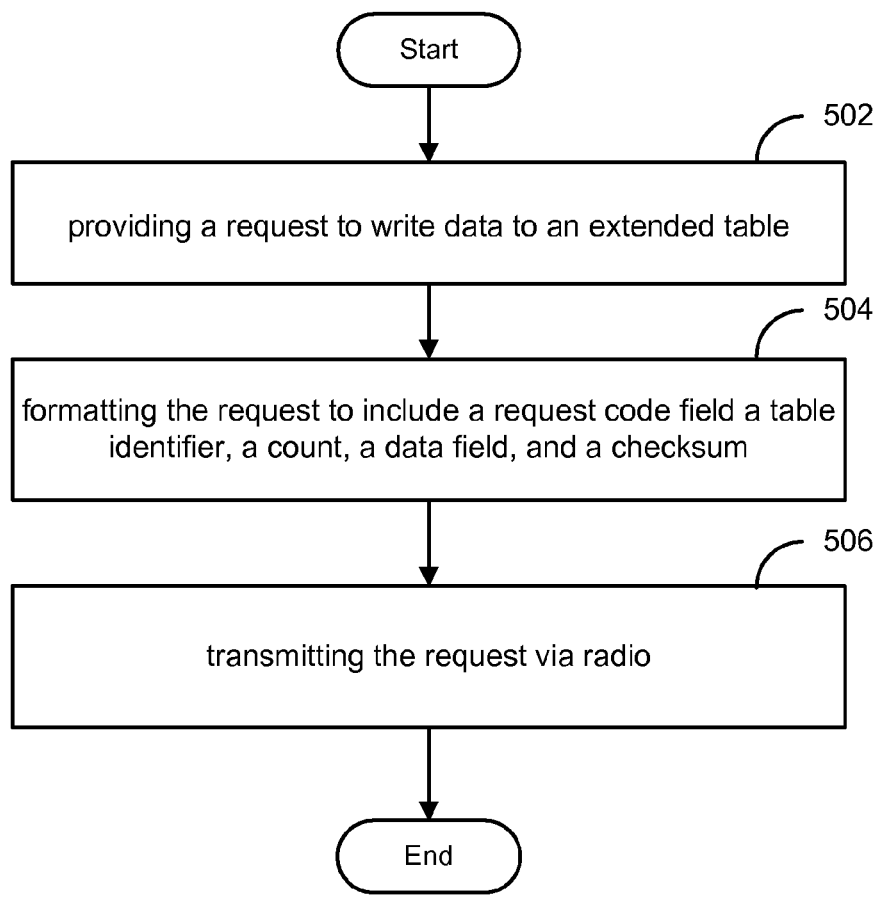
FIG. 5 depicts a flowchart of an example process for writing data.

FIG. 5 depicts a flowchart of an example of a process or method 500 for writing data. The process 500 is organized as a sequence of modules or steps in the flowchart. However, it should be understood that these and modules associated with other methods described herein may be reordered for parallel execution or into different sequences of modules or steps.

In the example of FIG. 5, the process for writing data 500 starts at module or step 502 with providing a request to write data to an extended table. The request can include energy use data, device instructions, firmware upgrades, test data, security information, time and date data, or any known or convenient data to be written to an extended table. The request can be provided by a head end system, a NAN device, a hand held field device, or any known or convenient device transmitting data to a NAN device to be written to an extended table.

In the example of FIG. 5, the process for writing data 500 continues to module or step 504 with formatting the request to include for example, a request code field, a table identifier, a data field, and a checksum. The request code field can be used to determine the type of request, for example, whether a read or a write is specified. Here, the request code can be a write code. A count can be included to specify the number of bytes of the table that are to be written, for example, 8 kb could be written. A table identifier can be included to specify a table to which to write data. The table can be a manufacturer specified table, or an extended table. The checksum can be included to store data used to validate the data included in the data field.

In the example of FIG. 5, the process for writing data 500 continues to module or step 506 with transmitting the request via radio. The request can be transmitted using any known or convenient radio protocol, for example, the 802.15.4 protocol can be used to transmit the request. Having transmitted the request the exemplary process 500 set forth in the flowchart terminates.

Figure 6:
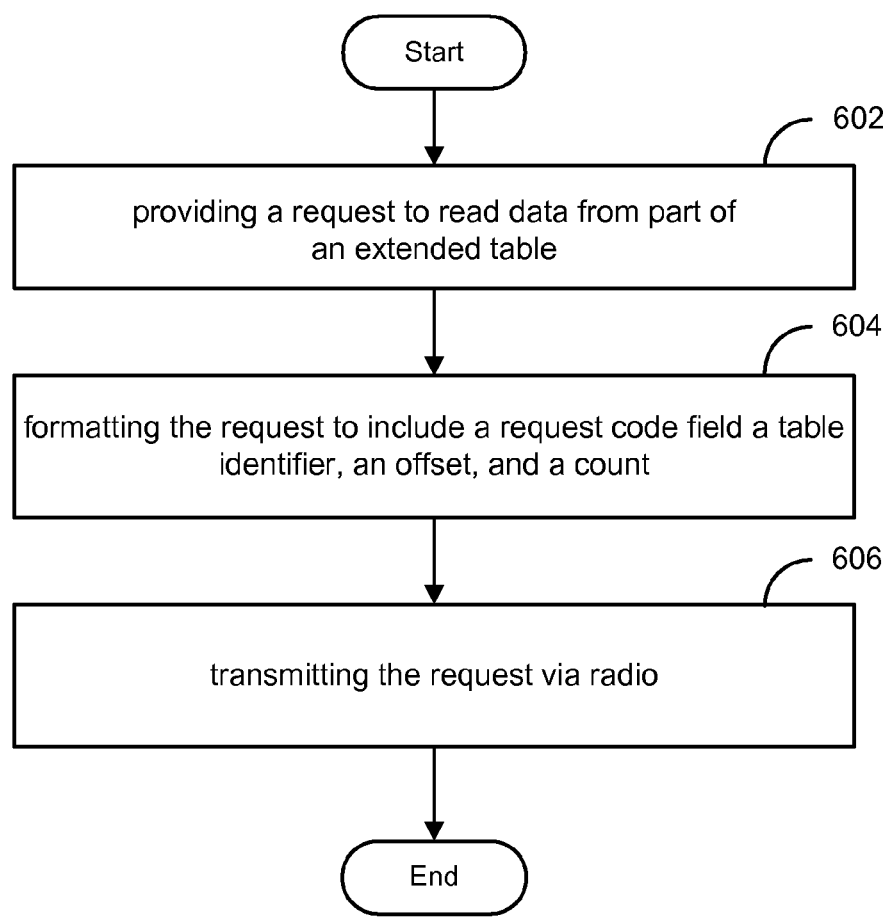
FIG. 6 depicts a flowchart of an example process for reading data.

FIG. 6 depicts a flowchart of an example of a process or method 600 for reading data. The process 600 is organized as a sequence of modules or steps in the flowchart. However, it should be understood that these and modules associated with other methods described herein may be reordered for parallel execution or into different sequences of modules or steps.

In the example of FIG. 6, the process for reading data 600 begins at module or step 602 with providing a request to read data from part of an extended table. The table can store energy use data, instructions, firmware upgrades, test data, security information, time and date data, or any known or convenient data to be written to an extended table. The data can be read from the beginning of the table, part way through the table, or at the end of the table.

In the example of FIG. 6, the process for reading data 600 continues to module or step 604 with formatting the request to include a request code field, a table identifier, an offset, and a count. The request code field can be used to determine the type of request, for example, whether a read or a write is specified. The table identifier can be used to specify a table from which to read data. The offset can be used to specify a starting address from which to read data. For example, the offset can specify the beginning, middle or end of the table. The count can be used to indicate the number of bytes that are to be read from the table at the offset.

In the example of FIG. 6, the process for reading data 600 continues to module or step 606 with transmitting the request via radio. The request can be transmitted using any known or convenient protocol, for example 802.15.4. Having transmitted the request via radio, the exemplary process 600 set forth in the flowchart terminates.

Figure 7:
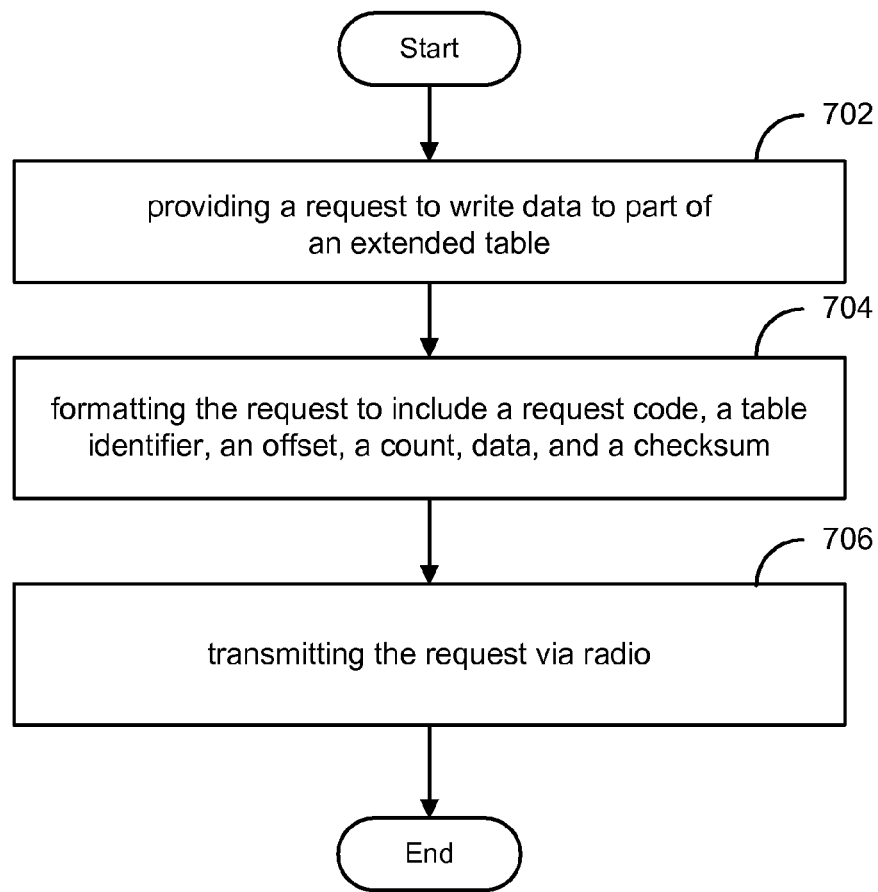
FIG. 7 depicts a flowchart of an example process for writing data.

FIG. 7 depicts a flowchart of an example of a process or method 700 for writing data. The process 700 is organized as a sequence of modules or steps in the flowchart. However, it should be understood that these and modules associated with other methods described herein may be reordered for parallel execution or into different sequences of modules or steps.

In the example of FIG. 7, the process for writing data 700 starts at module or step 702 with providing a request to write data to part of an extended table. The request can be provided by a NAN device, a head end system, a field unit, or another known or convenient device. An automated process or an individual can initiate the request to write data to part of an extended table.

In the example of FIG. 7, the process for writing data 700 continues to module or step 704 with formatting the request to include a request code, a table identifier, an offset, a count, and a checksum. The request code can indicate the nature of the request, in this case to write data. The table identifier can indicate the table to which to write data. The offset can indicate an address at which to begin writing data. For example, the beginning or the middle of the file can be specified. The checksum can be used to verify the integrity of the data to write.

In the example of FIG. 7, the process for writing data 700 continues to module or step 706 with transmitting the request via radio. The request can be transmitted by any known or convenient protocol, for example, IEEE 802.15.4. Having transmitted the request the exemplary process 700 set forth in the flowchart terminates.

Figure 8:
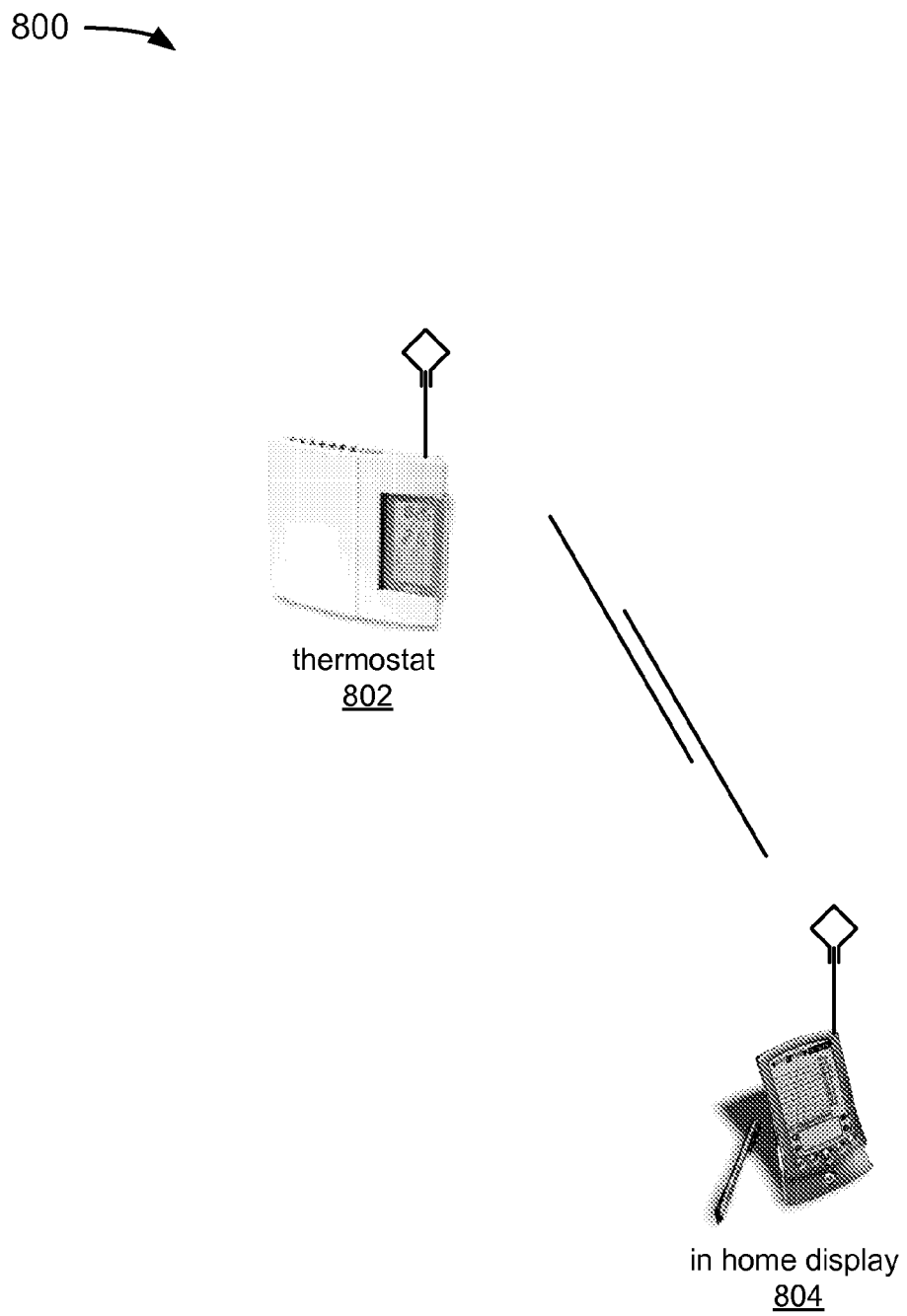
FIG. 8 depicts an example system for displaying data.

FIG. 8 depicts a non-limiting example of a system 800 for displaying data. The non-limiting exemplary system depicted in FIG. 8 includes by way of example, thermostat 802 and in home display 804. In the example of FIG. 8, thermostat 802 and in home display 804 are each NAN devices and are able to transmit data by wireless radio to other NAN devices, whether directly or indirectly via another intermediate NAN device.

In the example of FIG. 8, the thermostat 802 includes a unit controlling temperature in a home, office, building, room, or other space. Additionally, thermostat 802 includes a communications device coupled to a table data (such as may be stored in a data storage device or memory) and to a radio. The table data storage device or memory stores information from the unit controlling temperature, for example, energy used in controlling the temperature, pricing information, previous temperature settings, and other known or convenient data.

In the example of FIG. 8, the in home display 804 includes a user interface, such as is depicted including a display and one or more keys, buttons, or other devices to enter data with. Any known or convenient interface can be specified. The interface is coupled to table data, which is accessible to communications logic coupled to a radio.

In the example of FIG. 8 in operation, the thermostat 802 transmits energy use information to the in home display 804 to display to a user. The information can be formatted as a request to write data to a data table in the in home display 804. Alternatively the information can be formatted as a request from the in home display 804 to read data from a data table stored in the thermostat 802. Either the request to read or the request to write can be structured as a request to read or write data to a part of a table.

Figure 9:
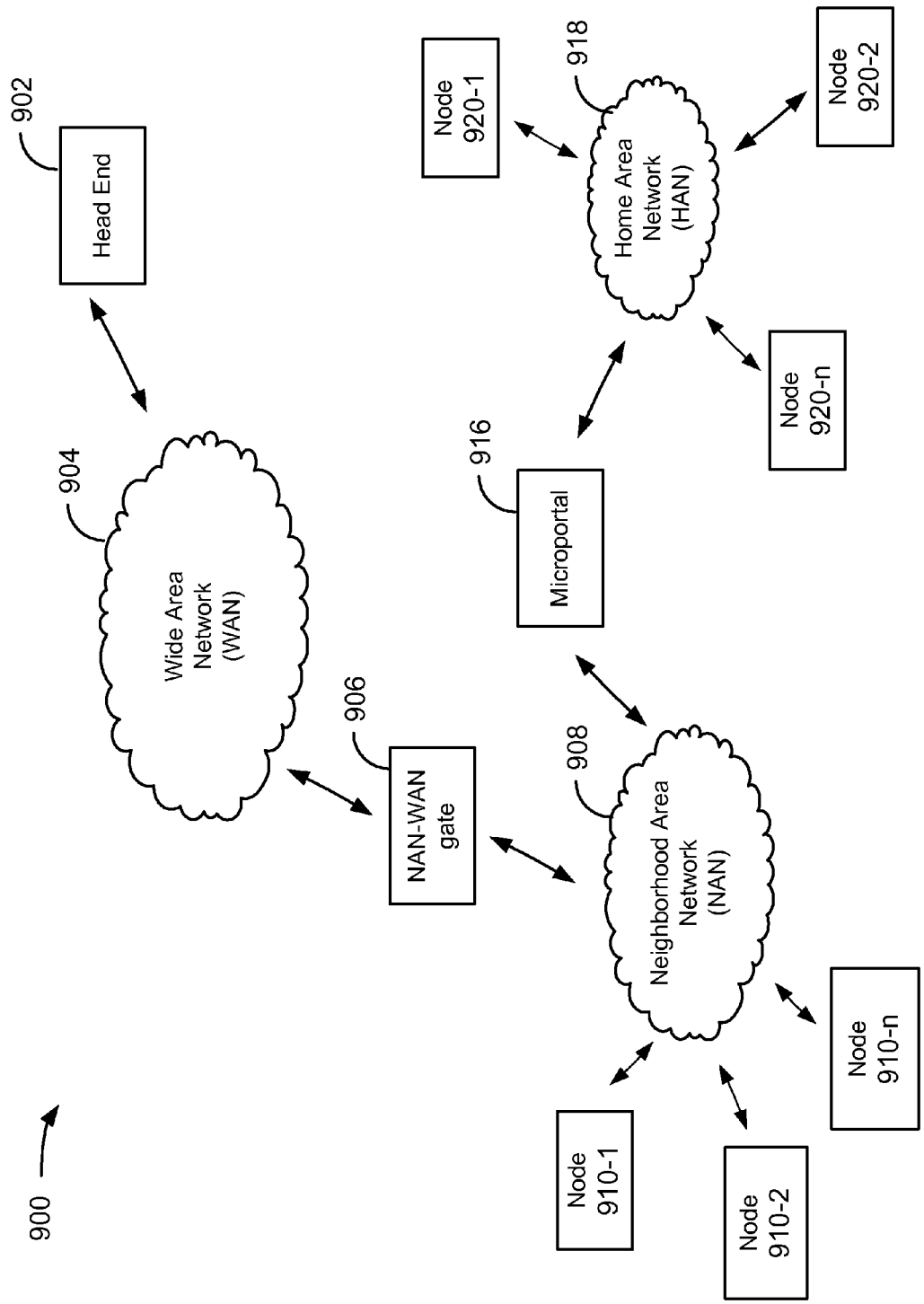
FIG. 9 depicts an exemplary configuration having a plurality of devices on an automated metering infrastructure (AMI) network.

FIG. 9 depicts an exemplary configuration having a plurality of devices on an automated metering infrastructure (AMI) network 900. FIG. 9 includes head end 902, wide area network (WAN) 904, NAN-WAN gate 906, neighborhood area network (NAN) 908, node 910-1, node 910-2, node 910-*n* (collectively nodes 910), microportal 916, home area network (HAN) 918 (sometimes referred to as a premise area network (PAN)), node 920-1, node 920-2, node 920-*n* (collectively nodes 920).

The head end 902, sometimes referred to as the back end, server, or head end server can include a suite of applications including functionality for an acquisition system, real-time data access, device management, network management, and other known or convenient functionality. The head end 902 can include one or more computing devices coupled or otherwise networked together.

The WAN 904 can be, for example, metropolitan area network (MAN), global area network such as the Internet, any combination of such networks, or any other known convenient medium for communicating data. The WAN 904 can include routers, switches and/or other networking hardware elements coupled together to provide communications to systems or within systems and devices coupled to the network 904.

The NAN-WAN gate 906, sometimes referred to as a mesh gate/collector, can include an IEEE 802.15.4 PAN Coordinator, an ANSI C12.22 Relay, a device collecting messages from multiple units on the NAN and a firewall. An IEEE 802.15.4 PAN Coordinator may be a device that is responsible for communication between devices on a NAN and complies with the IEEE 802.15.4 standard for transmission of data that is in effect as of the date of filing of this patent application. An ANSI C12.22 Relay may be a device that is responsible for communication between devices on a NAN and complies with the ANSI C12.22 standard for transmission of data that is in effect as of the date of filing of this patent application. An access point operable to perform many functions including, for example, but not limited to, one or any combination of: relaying information from the head end server to the nodes, routing information, aggregating information from the nodes and micro portals within its sub-network for transmission to the head end server, acting as a HAN coordinator, transmitting mass firmware upgrades, and multicasting messages. A NAN-WAN gate 906 may also be referred to as a collector because it collects information from the nodes 910 and micro portal 916 in its sub-network.

The NAN 908, can be a wireless, wired, or mixed wireless and wired network. The NAN 908 can transmit and receive signals using a protocol, for example, the IEEE 802.15.4 standard for transmission of data that is in effect as of the date of filing of this patent application can be used for wireless transmission. Similarly for wired transmission, the Ethernet/IEEE 802.3 interface standard could be used.

The nodes 910 can be devices operable to collect metering information and transmit and receive signals via the NAN using any known or convenient protocol. Examples of nodes 910 could be a meter, a thermostat, a remote appliance controller (RAC), in home display, or any known or convenient NAN device. Each of the nodes 910 could potentially serve as a NAN-WAN gate by the addition of a WAN radio or wired device allowing communication over the WAN 904.

The microportal 916, sometimes referred to as a micro access portal or home gateway, may be a gateway in the sense that a protocol used by devices connected to the gateway use a different protocol than the gateway uses to connect to the nodes 920. In a non-limiting example, ZigBee, Z-Wave, or X-4 may be used by the nodes 920 to connect to the microportal 916 whereas the microportal 916 uses the Trilliant transport protocol to connect to the NAN-WAN gate 908.

The HAN 918 can be a wireless, wired, or mixed wireless and wired network. The NAN 908 can transmit and receive signals using a protocol, by way of example and not limitation, the ZigBee, Z-Wave, or X-4 standard for transmission of data that is in effect as of the date of filing of this patent application can be used for wireless transmission. Similarly for wired transmission, the Ethernet/IEEE 802.3 interface standard could be used as well as other known or convenient wired interfaces.

The nodes 920 can be devices operable to collect metering information and transmit and receive signals via the HAN using any known or convenient protocol. Examples of nodes 920 could be a meter, a thermostat, a remote appliance controller (RAC), in home display, or any known or convenient NAN device. Each of the nodes 910 could potentially serve as a microportal by the addition of a NAN radio or wired device allowing communication over the NAN 904. Each of the nodes 920 may include a radio and a processor coupled to a memory storing instructions. The nodes 920, may each communicate using the ZigBee protocol, the Z-Wave protocol, X-10 or another known or convenient protocol.

It will be appreciated to those skilled in the art that the preceding examples and embodiments are exemplary and not limiting in scope. It is intended that all permutations, enhancements, equivalents, and improvements thereto that are apparent to those skilled in the art upon a reading of the specification and a study of the drawings are included within the true spirit and scope of these teachings. It is therefore intended that the following appended claims include all such modifications, permutations, and equivalents as fall within the true spirit and scope of these teachings.

What is claimed is:

1. A mesh network system comprising:
 a transmitting mesh device in communication with an energy using device, the transmitting mesh device comprising:
  a data storage unit storing data in a standard table and an extended table, the extended table including energy use information of the energy using device and the standard table including one or more of general configuration information, manufacturer identification information, mode information and status information;
  a radio to receive a request for energy use information from a receiving mesh device and to transmit a message to the receiving mesh device, the request comprising a request code field specifying a type of request, a table identifier specifying the extended table, an offset specifying a location in the extended table, and a count specifying a number of bytes to be read from the extended table at the location; and
  a communications logic unit in communication with the radio operable to read data from the standard table and extended table and to format the data as the message including the energy use information, based on the received request; and
 a receiving mesh device in communication with the transmitting mesh device, the receiving mesh device comprising:
  a data storage unit for storing table data;
  a radio for sending the request for energy use information comprising the request code field, the table identifier, the offset and the count, and for receiving the message transmitted by the transmitting device;

a communications logic unit coupled to the radio, the communications logic unit operable to read the message and write the received energy use information to the storage unit; and a display;

wherein the receiving mesh device originates the request for energy use information and displays the energy use information to a user.

2. The system of claim 1, wherein the energy using device regulates temperature in a room.

3. The system of claim 1, wherein the energy using device is an electricity meter.

4. The system of claim 1, wherein the data stored in the extended table of the transmitting mesh device includes mesh radio information used by the radio to transmit data over a neighborhood area network (NAN).

5. The system of claim 1, wherein the data storage unit of the transmitting mesh device includes an address identifying a location on a mesh network.

6. The system of claim 1, wherein the data stored in the data storage unit of the transmitting mesh device includes a GPS coordinate.

7. A mesh network system comprising:

a receiving mesh device comprising:
  a data storage unit for storing table data;
  a radio for sending a request for energy use information and for receiving a message from a transmitting mesh device, the request comprising a request code field specifying a type of request, a table identifier specifying an extended table at the transmitting mesh device, an offset specifying a location in the extended table, and a count specifying a number of bytes to be read from the extended table at the location;
  a communications logic unit coupled to the radio, the communications logic unit operable to read received messages and write energy use information to the data storage unit;
  a display for displaying the energy use information to a user; and a transmitting mesh device in communication with the receiving mesh device and an electricity meter reporting energy use information collected by the electricity meter, the transmitting mesh device comprising:
  a data storage unit storing data in a standard table and an extended table, the extended table including the energy use information collected from the electricity meter and mesh radio information used to transmit the data over a neighborhood area network (NAN), the standard table including one or more of general configuration information, manufacturer identification information, mode information and status information;
  a communications logic unit having an address on a NAN and operable to read data from the extended table and format the data as a message including the energy use information according to the mesh radio information, based on the request for energy use information; and
  a radio coupled to the communications logic unit to transmit the message to the requesting mesh device on the NAN upon receiving the request for energy use information from the requesting mesh device, wherein the requesting mesh device originates the request for energy use information and displays the energy use information to a user.

8. A method comprising:

providing, by a receiving mesh device, a request to write energy use information data to an extended table within a data storage unit, the data storage unit storing data in the extended table and a standard table including one or more of general configuration information, manufacturer identification information, mode information and status information;

formatting, by the receiving mesh device, the request as a message including a request code field specifying a type of request, a table identifier specifying the extended table, an offset specifying a location in the extended table, and a count specifying a number of bytes to be written to the extended table at the location;

transmitting the message to a transmitting mesh device via a radio of the receiving mesh device;

receiving, by the receiving mesh device, energy use information data from the transmitting mesh device;

writing, by the receiving mesh device, the energy use information data in the extended table; and displaying, by the receiving mesh device, the energy use information data to a user, wherein the receiving mesh device originates the request to write energy use information.

9. The method of claim 8, wherein the message further comprises a checksum, wherein the checksum may be used to validate data integrity.

10. The method of claim 8, wherein the message is transmitted over a wireless radio via a mesh network.

11. The method of claim 10, wherein the mesh network includes a plurality of wireless mesh nodes for receiving and transmitting radio signals.

12. A method according to claim 8 further comprising:

receiving, by the transmitting device, a request to read data from an extended table of the transmitting device;

formatting, by the transmitting device, a message including a request code field, a table identifier, the energy use data and a count; and transmitting the message to the receiving mesh device via radio.

13. The method of claim 12, wherein the transmitted message from the transmitting mesh device further comprises an offset, the offset identifying a location in the extended table to begin reading the energy use information.

14. The method of claim 12, wherein the transmitted message from the transmitting mesh device further comprises a checksum, wherein the checksum may be used to validate data integrity.

15. The method of claim 12, wherein the message is transmitted via a mesh network.

16. A computer program stored in a non-transitory computer readable form for execution in a processor and a processor coupled memory to implement a method comprising:

providing, by a receiving mesh device, a request to write energy use information data to an extended table within a data storage unit, the data storage unit storing data in the extended table and a standard table including one or more of general configuration information, manufacturer identification information, mode information and status information;

formatting, by the receiving mesh device, the request as a message including a request code field specifying a type of request, a table identifier specifying the extended table, an offset specifying a location in the extended table, and a count specifying a number of bytes to be written to the extended table at the location;

transmitting the message to a transmitting mesh device over a radio of the receiving mesh device;
receiving, by the receiving mesh device, energy use data from the transmitting mesh device; and
writing, by the receiving mesh device, the energy use data in the extended table;
wherein the receiving mesh device originates the request for energy use information and displays the energy use information to a user.

* * * * *